United States Patent
Usui

[11] Patent Number: 5,958,602
[45] Date of Patent: Sep. 28, 1999

[54] MULTI-WALLED STEEL PIPE

[75] Inventor: Masayoshi Usui, Numazu, Japan

[73] Assignee: Usui Ko Kusai Sangyo Kaisha Limited, Japan

[21] Appl. No.: 07/898,462

[22] Filed: Jun. 15, 1992

Related U.S. Application Data

[63] Continuation of application No. 07/686,762, Apr. 17, 1991, abandoned.

[30] Foreign Application Priority Data

Apr. 25, 1990 [JP] Japan ............................ 2-109440

[51] Int. Cl.$^6$ ................ F16L 9/02; F16L 9/18; B32B 1/08
[52] U.S. Cl. .............. 428/592; 428/612; 428/677; 428/685; 138/142; 138/143; 138/144
[58] Field of Search .................... 428/609, 612, 428/586, 587, 685, 592, 677; 138/142, 143, 144; 29/188

[56] References Cited

U.S. PATENT DOCUMENTS

| | | | |
|---|---|---|---|
| 2,104,884 | 1/1938 | Quarnstrom | 138/142 |
| 2,375,661 | 5/1945 | Karmazin | 29/188 |
| 2,529,884 | 11/1950 | Reynolds | 138/DIG. 10 |
| 3,091,262 | 5/1963 | Donaldson | 138/143 |
| 3,584,655 | 6/1971 | Frank | 138/143 |
| 3,610,290 | 10/1971 | Anderson | 138/143 |
| 4,244,482 | 1/1981 | Baumgart et al. | 138/143 |
| 4,723,602 | 2/1988 | Huigen et al. | 138/143 |
| 4,862,549 | 9/1989 | Criswell | 15/104.04 |

OTHER PUBLICATIONS

Howard H. Manko, "Solders and Soldering", McGraw–Hill Book Co., 1964 (No Month), pp. 173–174.

Metals Handbook, $9^{th}$ Ed., vol. 6 "Welding, Brazing, and Soldering", American Society for Metals, Metals Park, OH, 1983 (No Month), pp. 937–938.

*Primary Examiner*—John J. Zimmerman
*Attorney, Agent, or Firm*—Anthony J. Casella; Gerald E. Hespos; Ludomir A. Budzyn

[57] ABSTRACT

A multi-walled steel pipe includes at least two pipe bodies of different diameters. The two pipe bodies are overlapped with one another. Either the inner surface of the outer pipe body or the outer surface of the inner pipe body is a rough surface having a roughness of 10 to 30 $\mu$m. The rough surface is made by brasting, etching, or brushing or by the use of rolls. At least one of the overlapping surfaces is plated with copper to provide a brazing layer by which the overlapping surfaces are brazed together. The pipe bodies are double-walled stainless pipes, seamless stainless pipes, or electroseamed pipes.

6 Claims, 1 Drawing Sheet

MULTI-WALLED STEEL PIPE

This application is a continuation of application Ser. No. 07/686,762, filed Apr. 17, 1991, now abandoned.

BACKGROUND OF THE INVENTION

1. Field of the Invention

The present invention relates to a multi-walled steel pipe having a small diameter, typically less than 20 m/m, and providing sufficient resistance to pressure and mechanical strength, generally designed for use in an automotive vehicle or other machines and apparatus as an oil or gas feed pipe or a fuel injection pipe for a diesel engine.

2. Description of the Prior Art

As shown in FIG. 6, a conventional multi-walled steel pipe of this type includes a plurality of pipe bodies P1' and P2' of different diameters. Each body, a seamed or drawn pipe, has a flat peripheral surface 13 which is plated with copper to provide a brazing layer. The peripheral surfaces of the pipe bodies are overlapped as at 12 and brazed together as at 14.

However, in the prior art, the overlapping surface 12 is a flat surface. When the pipe bodies are heated in a furnace at a melt temperature of the brazing layer, part of the pipe bodies may not be brazed (namely, pinholes) due to the difference in wettability between the overlapping surfaces 12. This deteriorates its resistance to pressure and mechanical strength against cracking and breakage and thus, the quality of the pipe.

SUMMARY OF THE INVENTION

In view of the foregoing, it is an object of the present invention to provide a multi-walled steel pipe wherein a brazing material can constantly and substantially evenly be wet upon heating so as to promote capillary action to provide uniform distribution of the brazing material between the overlapping surfaces, to substantially reduce pinholes, and to securely braze the overlapping surfaces together.

In order to achieve these objects, there is provided a multi-walled steel pipe including a plurality of pipe bodies of different diameters. The pipe bodies are overlapped with one another. At least one of the overlapping surfaces, either the inner surface or the outer surface of the pipe body, is a rough surface, and the overlapping surfaces are brazed together. Each pipe body may be a double-walled stainless pipe, a seamless stainless pipe, or an electroseamed stainless pipe. At least two pipe bodies are assembled to form a pipe.

With the present invention thus constructed, a brazing material can constantly and substantially evenly be wet upon heating of the brazing material so as to promote capillary action. This enables uniform distribution of the brazing material between the overlapping surfaces, substantially reduces pinholes, enables complete brazing of the overlapping surfaces, and improve resistance to pressure as well as mechanical strength against cracking and breakage. The present invention thus provides a high quality product.

BRIEF DESCRIPTION OF THE DRAWINGS

For a better understanding of the present invention, reference may be made to the following description of preferred embodiments when taken in conjunction with the accompanying drawings, in which.

DETAILED DESCRIPTION OF PREFERRED EMBODIMENTS

Figure 1:
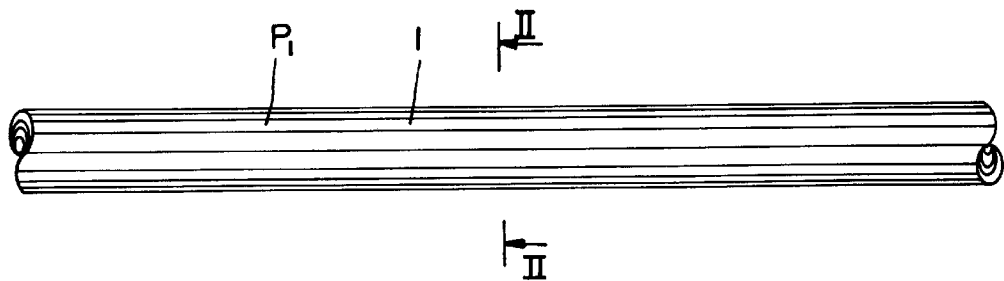
FIG. 1 is a plan view of a multi-walled steel pipe according to one embodiment of the present invention.
Figure 2:
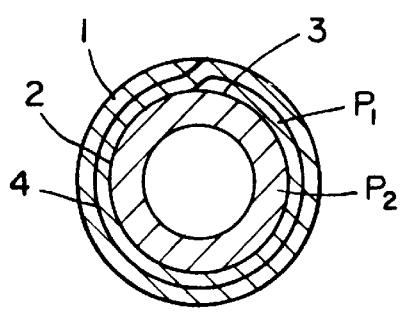
FIG. 2 is a sectional view, on an enlarged scale, taken on the line II—II of FIG. 1.
Figure 3:
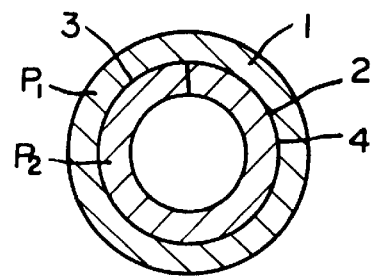
FIGS. 3 to 5 are views similar to FIG. 2, but showing different embodiments of the present invention.
Figure 4:
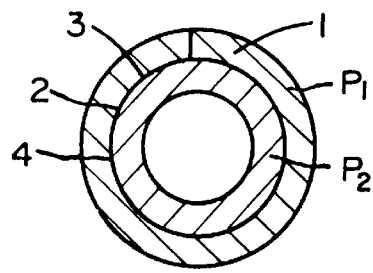
Figure 5:
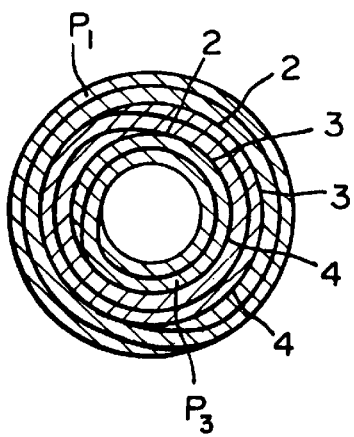
Figure 6:
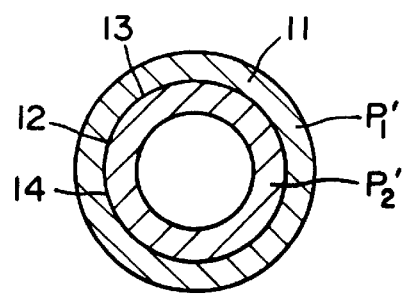
FIG. 6 is a transverse sectional view, on an enlarged scale, of a conventional steel pipe.

With reference to FIGS. 1 to 5, the reference numeral 1 designates a multi-walled steel pipe having a diameter of less than 15 m/m. A plurality of pipe bodies P1 and P2 of different diameters are previously plated with copper to provide a brazing layer of 2 to 3 $\mu$m and overlapped with each other as at 2. Either one of the overlapping surfaces 2, i.e., the inner surface of the pipe body P1 or the outer surface of the pipe body P2, is roughened to provide a rough surface 3 having a roughness of preferably 10 to 30 $\mu$m. Alternatively, either the inner surface of the pipe body P1 or the outer surface of the pipe body P2 may first be roughened and then plated with copper to provide a brazing layer thereon. The pipe bodies thus made are, then, heated at a melt temperature of the brazing layer, preferably 1120 to 1200° C. so as to braze the overlapping surfaces 2. Each of the pipe bodies P1 and P2 is a double-walled stainless pipe (FIG. 2), a seamless stainless pipe (FIGS. 2 and 4), or an electroseamed stainless pipe (FIG. 3). As shown in FIGS. 2 and 4, two pipe bodies are assembled. As shown in FIG. 5, three pipe bodies are assembled. The rough surface 3 is made by blasting, etching, or brushing or by the use of rolls. Through experiments, it has been found that the rough surface 3 preferably have a roughness of 10 to 30 $\mu$m. If it is less than 10 $\mu$m, a brazing material may not uniformly be wet. On the other hand, if the overlapping surfaces 2 are too rough, or have a roughness of greater than 30 $\mu$m, then they may not properly be brazed. This results in formation of pinholes.

In the multi-walled steel pipe 1 of the present invention thus far described, at least one of the overlapping surfaces, i.e., the inner surface of the pipe body P1 or the outer surface of the pipe body P2, is a rough surface, and the overlapping surfaces are brazed together as at 4. Upon heating, a brazing material becomes constantly and substantially uniformly wet and may exist uniformly between the overlapping surfaces 2 under capillary action. This substantially reduces pinholes and ensures complete brazing of the pipe bodies. The steel pipe of the invention provides an improved resistance to pressure and mechanical strength against cracking and breakage, is excellent in quality, and is highly useful.

Although preferred embodiments of the present invention have been described in detail, it will be understood by those skilled in the art that various changes and modifications may be made therein without departing from the spirit and scope of the invention.

I claim:

1. A multi-walled steel pipe having an outer diameter of less than 15 mm and comprising at least two pipe bodies having different diameters and assembled in overlapping relation, said at least two pipe bodies including a single-walled stainless steel inner pipe body and a double-walled stainless steel outer pipe body, said double-walled outer pipe body having an inner layer and an outer layer extending unitarily from and wrapped around said inner layer, each of said layers having inner and outer surfaces, said inner surfaces being plated with copper having a thickness of 2–3 µm, the inner surfaces being rough surfaces having a roughness of 10 to 30 µm, said multi-walled steel pipe being heated to a temperature of 1120 to 1200° C., such that the copper plating effectively brazes the inner surface of said inner layer of said outer pipe body to portions of the inner pipe body and brazes the inner surface of said outer layer to the outer surface of the inner layer of the outer pipe body.

2. A multi-walled steel pipe according to claim 1, wherein such rough surface is made by blasting.

3. A multi-walled steel pipe according to claim 1, wherein said inner pipe body is selected from the group consisting of a seamless stainless pipe and an electroseamed pipe.

4. A multi-wallet steel pipe according to claim 1, wherein said rough surface is made by etching.

5. A multi-walled steel pipe according to claim 1, wherein said rough surface is made by brushing.

6. A multi-walled steel pipe according to claim 1, wherein said rough surface is made by rolls.

\* \* \* \* \*